(12) United States Patent
Kudo (10) Patent No.: US 11,987,263 B2
(45) Date of Patent: May 21, 2024

(54) VEHICLE TRAVEL ASSISTANCE METHOD, VEHICLE TRAVEL ASSISTANCE DEVICE, AND AUTONOMOUS DRIVING SYSTEM

(71) Applicant: HITACHI ASTEMO, LTD., Hitachinaka (JP)

(72) Inventor: Kei Kudo, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 443 days.

(21) Appl. No.: 17/297,515

(22) PCT Filed: Nov. 27, 2019

(86) PCT No.: PCT/JP2019/046275
§ 371 (c)(1),
(2) Date: May 27, 2021

(87) PCT Pub. No.: WO2020/116264
PCT Pub. Date: Jun. 11, 2020

(65) Prior Publication Data
US 2022/0032948 A1    Feb. 3, 2022

(30) Foreign Application Priority Data

Dec. 6, 2018  (JP) .................................. 2018-228843

(51) Int. Cl.
*B60W 60/00*   (2020.01)
*B60W 30/10*   (2006.01)
*G08G 1/0968*  (2006.01)

(52) U.S. Cl.
CPC .......... *B60W 60/001* (2020.02); *B60W 30/10* (2013.01); *G08G 1/096827* (2013.01); *B60W 2530/201* (2020.02)

(58) Field of Classification Search
CPC .............. B60W 60/001; B60W 30/10; B60W 2530/201; G08G 1/096827
See application file for complete search history.

(56) References Cited

FOREIGN PATENT DOCUMENTS

| JP | 2006-273230 A | 10/2006 |
|----|---------------|---------|
| JP | 2007-248183 A | 9/2007 |
| JP | 2012-221291 A | 11/2012 |
| JP | 2013-196612 A | 9/2013 |

(Continued)

OTHER PUBLICATIONS

International Search Report, PCT/JP2019/046275, dated Mar. 24, 2020, 3 pgs.

*Primary Examiner* — Michael D Lang
(74) *Attorney, Agent, or Firm* — Volpe Koenig (57) ABSTRACT

Autonomous driving is possible even in a no-lane section. Probe information to be transmitted from a plurality of vehicles is stored. Vehicle travel trajectory information in a no-lane section is extracted from the stored probe information, the vehicle travel trajectory information is extracted per combination of an entry point and an exit point for the no-lane section, the extracted vehicle travel trajectory information per combination of the entry point and exit point for the no-lane section is sorted into a plurality of categories according to a predetermined criterion, and statistical trajectory information is calculated by statistical processing of the travel trajectory information for each of the plurality of categories. The calculated statistical trajectory information is transmitted to the plurality of vehicles as vehicle route information in the no-lane section.

12 Claims, 10 Drawing Sheets

(56) References Cited

FOREIGN PATENT DOCUMENTS

| | | |
|---|---|---|
| JP | 2016-149050 A | 8/2016 |
| JP | 2016-224593 A | 12/2016 |
| JP | 2018-072070 A | 5/2018 |
| JP | 2018-077603 A | 5/2018 |
| WO | 2018/123014 A1 | 7/2018 |

| | WHEEL BASE (VEHICLE LENGTH) | | |
|---|---|---|---|
| | SHORT | MEDIUM | LONG |
| PASSAGE TIME SHORT | A1 | B1 | C1 |
| PASSAGE TIME MEDIUM | A2 | B2 | C2 |
| PASSAGE TIME LONG | A3 | B3 | C3 |

VEHICLE TRAVEL ASSISTANCE METHOD, VEHICLE TRAVEL ASSISTANCE DEVICE, AND AUTONOMOUS DRIVING SYSTEM

TECHNICAL FIELD

The present invention relates to a travel assistance method and a travel assistance device which generate route information for a no-lane section and assist a vehicle to travel in the no-lane section by autonomous driving, and an autonomous driving system that enables traveling in a no-lane section by autonomous driving.

BACKGROUND ART

In autonomous driving (for example, Level 3 or higher as defined by Society of Automotive Engineers (SAE)), traveling control of a vehicle is performed using advanced sensing techniques. As an example, in order for an autonomously driving vehicle to maintain a lane along a traveling lane, the vehicle detects a white line drawn on a road and controls a deviation in the lateral direction of the road. PTL 1 discloses a road shape detection system that identifies a road shape based on vehicle travel information in order to obtain detailed information on the road shape for autonomous driving assistance.

CITATION LIST

Patent Literature

PTL 1: JP 2016-224593 A

SUMMARY OF INVENTION

Technical Problem

According to PTL 1, it is described that autonomous driving assistance can be continuously performed even in a section where a lane marking is not recognizable due to factors such as a lane marking (white line) becoming thin.

However, a road on which a vehicle travels has an area where there is originally no feature useful for formulating a travel plan, such as the lane marking (white line). For example, there is no lane marking serving as a guide near intersections on general roads or toll houses on toll roads (such areas are called "no-lane sections"). If stable autonomous driving can be realized in such a no-lane section, the burden on a driver can be significantly reduced.

Note that, in the road shape detection system of PTL 1, both of travel information of a vehicle traveling in a state where autonomous driving assistance related to lane keeping traveling is performed and travel information of a vehicle traveling in a state where the autonomous driving assistance related to the lane keeping traveling is not performed are used in order to identify an accurate road shape. Therefore, it is difficult to apply the technique disclosed in PTL 1 in the no-lane section including no lane marking where it is difficult to perform the autonomous driving assistance in the first place.

Solution to Problem

A vehicle travel assistance method, which is an embodiment of the present invention, in a no-lane section includes: a probe information storage step of storing probe information transmitted from a plurality of vehicles; a matching processing step of extracting travel trajectory information of the vehicles in the no-lane section from the probe information stored in the probe information storage step and extracting vehicle travel trajectory information per combination of an entry point and an exit point for the no-lane section; a statistical processing step of sorting the vehicle travel trajectory information per combination of the entry point and the exit point for the no-lane section extracted in the matching processing step into a plurality of categories according to a predetermined criterion and calculating statistical trajectory information by statistical processing of the travel trajectory information for each of the plurality of categories; and a route information transmission step of transmitting the statistical trajectory information calculated in the statistical processing step to the plurality of vehicles as vehicle route information in the no-lane section.

In addition, an autonomous driving system, which is another embodiment of the present invention, includes: a map position unit that manages an autonomous driving map and estimates a position of an own vehicle; and a travel control unit that formulates a travel plan based on map information from the map position unit. The autonomous driving map has route information, obtained for each of a plurality of categories sorted according to a predetermined criterion, for a no-lane section per combination of an entry point and an exit point for the no-lane section. The map position unit selects one or a plurality of pieces of the route information for each of the plurality of categories for the no-lane section based on a traveling state of the own vehicle. The travel control unit formulates a travel plan of a route including the no-lane section based on the one or plurality of pieces of route information selected by the map position unit.

Advantageous Effects of Invention

Autonomous driving is possible even in a no-lane section.

Other objects and novel characteristics will be apparent from description of the present specification and the attached drawings.

DESCRIPTION OF EMBODIMENTS

Figure 1:
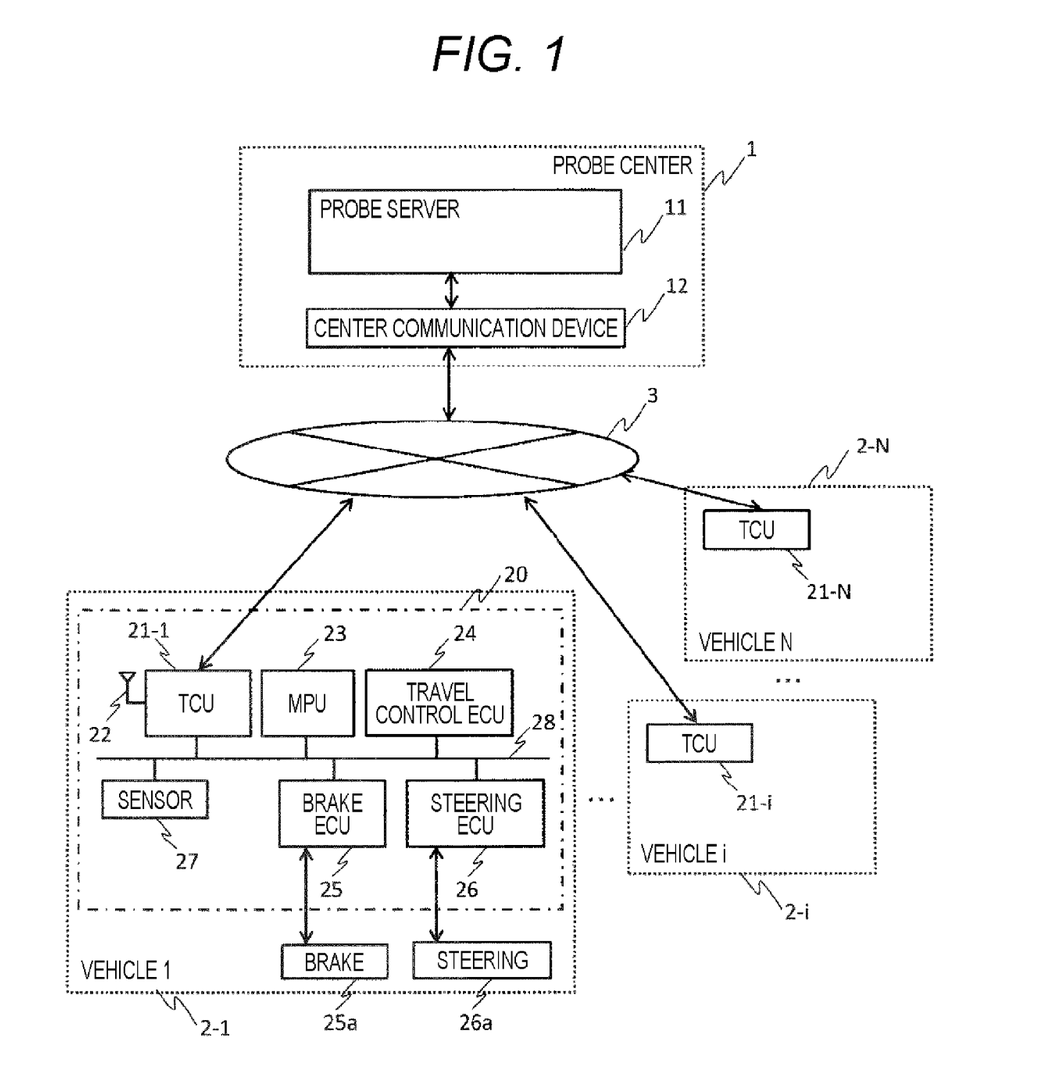
FIG. 1 is a block diagram of a vehicle travel assistance system.

FIG. 1 illustrates a block diagram of a vehicle travel assistance system of the present embodiment. The vehicle travel assistance system includes a probe center 1 that is connected to be capable of communicating with a plurality of vehicles 2-1 to 2-N via a network 3.

The probe center 1 includes a probe server (vehicle travel assistance device) 11 that collects probe information from a vehicle 2 and analyzes a travel trajectory of the vehicle in a no-lane section and a center communication device 12 that connects the probe server 11 to the network 3 so as to enable communication. The probe server 11 can be realized as a general computer system. The probe server 11 may be realized on a cloud.

The vehicle 2 is a vehicle traveling on a road, and transmits the probe information including a travel trajectory of the own vehicle to the probe server 11 via the network 3. The vehicle 2 is equipped with an autonomous driving system 20. The autonomous driving system 20 includes, for example, a telematics control unit (TCU) 21, a map position unit (MPU) 23, a travel control electronic control unit (ECU) 24, a brake ECU 25, a steering ECU 26, and sensors 27, and these units are connected to be capable of communicating via an in-vehicle network 28 such as a controller area network (CAN). Note that autonomous driving is assumed to be Level 3 or higher as defined by Society of Automotive Engineers (SAE), for example.

The TCU 21 is a functional unit configured for the autonomous driving system 20 to communicate with an external device such as the network 3. A modem compatible for various wireless communication standards is provided to support communication with transportation infrastructure, the cloud, other automobiles, and the like. In addition, in this example, a global navigation satellite system (GNSS) antenna 22 is connected such that a signal from the satellite can also be received.

Although described in detail later, the MPU 23 grasps position information of the own vehicle in real time using position information obtained by the GNSS and travel information detected by the sensor of the own vehicle, and transmits the position information to probe center 1 as the probe information. In addition, when an autonomous driving map is updated at the probe center 1, map information related to the update is received and map information held by the MPU 23 is updated.

The travel control ECU 24 uses the map information held by the MPU 23 to formulate a travel plan and controls the own vehicle according to the formulated travel plan. Therefore, the various sensors 27 are provided in the vehicle in order to grasp a surrounding situation of the own vehicle and a traveling state of the own vehicle, and the travel control ECU 24 collects outputs from the various sensors 27 via the in-vehicle network 28. The sensors 27 included in the autonomous driving system 20 are not particularly limited, but include a camera for recognizing a white line or an obstacle displayed on a road, a laser radar (LiDAR: Light Detection and Ranging), a millimeter wave sensor, a vehicle speed sensor for grasping a traveling state of a vehicle, an acceleration sensor, an angular velocity sensor, and the like. In addition, a control signal is output via the in-vehicle network 28 to an actuator controller that controls a brake 25a, a steering 26a, and the like (here, the brake ECU 25 and the steering ECU 26 are illustrated as examples) in order to control the own vehicle according to the travel plan.

Figure 2:
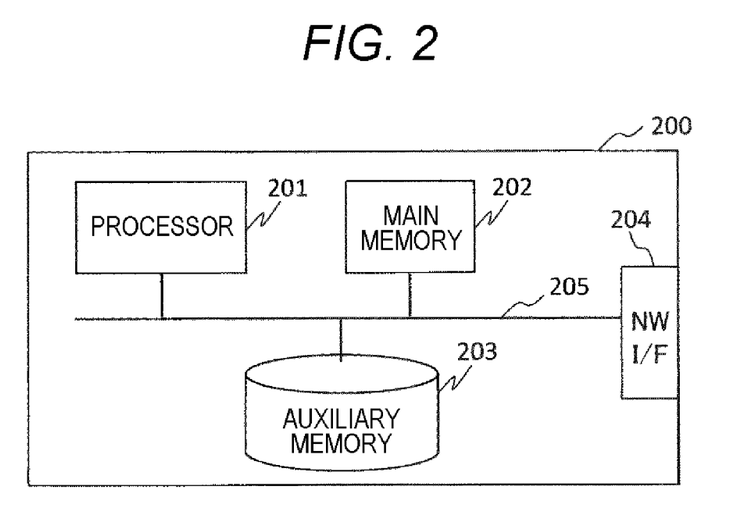
FIG. 2 is a hardware configuration example of a functional unit.

FIG. 2 illustrates a hardware configuration example of a functional unit such as the ECU forming the autonomous driving system 20. The functional unit 200 includes a processor 201, a main memory 202, an auxiliary memory 203, and a network interface 204 which are connected to be capable of communicating via a bus 205. The network interface 204 is an interface for connection with the in-vehicle network 28. The auxiliary memory 203 is usually configured using a non-volatile memory such as a read only memory (ROM) and a flash memory, and stores a program executed by the functional unit 200, data to be processed by the program, and the like. The main memory 202 is configured using a random access memory (RAM), and temporarily stores a program, data necessary for executing the program, and the like by a command of the processor 201. The processor 201 executes the program loaded from auxiliary memory 203 to the main memory 202. Note that FIG. 2 illustrates a basic hardware configuration related to an arithmetic function of the functional unit 200, and another hardware may be mounted depending on a processing function of the functional unit 200. For example, a digital signal processor (DSP) or a programmable logic device (PLD) that specially executes a predetermined operation may be mounted. In addition, the TCU 21 is also equipped with an RF module that processes a radio frequency signal.

Figure 3:
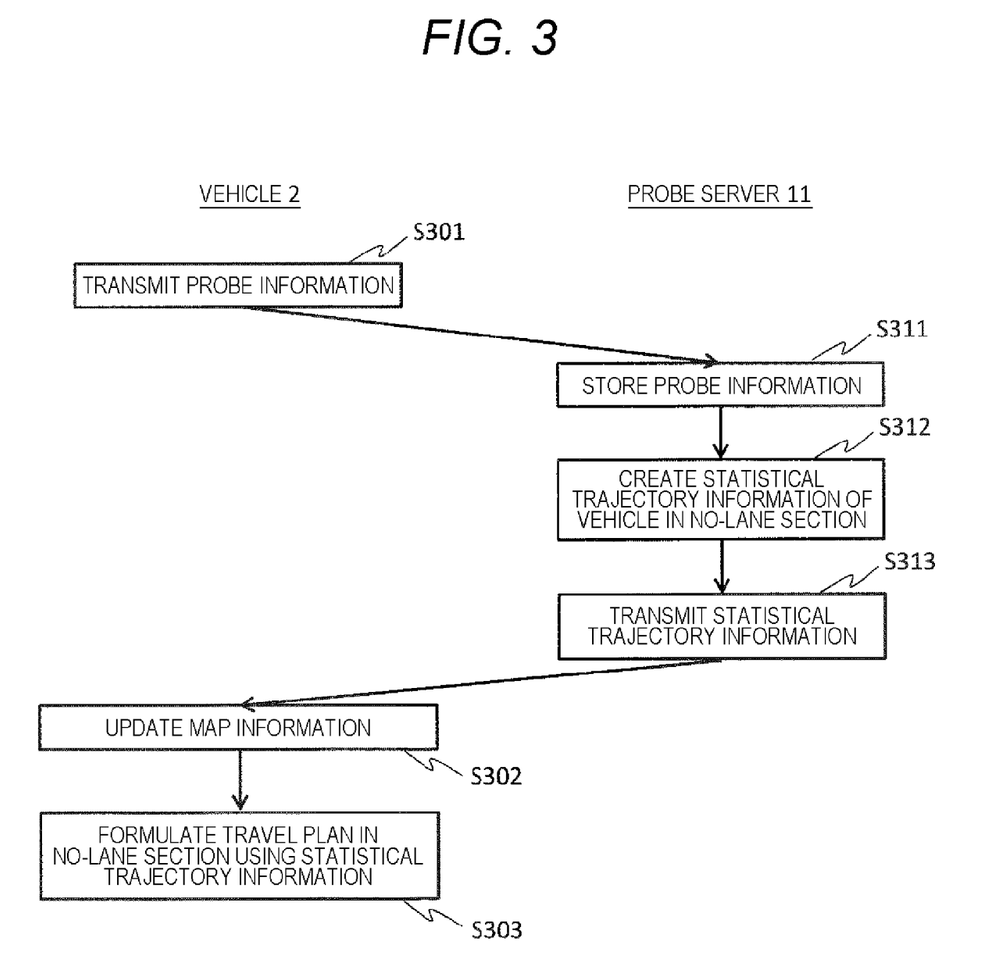
FIG. 3 is a flowchart for realizing autonomous driving in a no-lane section.

FIG. 3 illustrates a flowchart that realizes autonomous driving in a no-lane section in a vehicle travel assistance system. First, the MPUs 23 of vehicles 2-1 to 2-N transmit probe information of own vehicles to the probe server 11 (S301). The probe server 11 stores the probe information from the vehicles 2-1 to 2-N in a storage (S311). The probe server 11 creates statistical trajectory information of a vehicle in the no-lane section based on the stored probe information (S312), and transmits the statistical trajectory information to the vehicles 2-1 to 2-N as route information of the no-lane section. Although the execution is not particularly limited, Steps S312 and S313 may be executed periodically or executed by being triggered by the storage of new probe information above a certain level.

The statistical trajectory information forms part of an autonomous driving map owned by the MPUs 23 of the vehicles 2-1 to 2-N, and the MPU 23 receives the statistical trajectory information from the probe server 11 and updates map information based on the received statistical trajectory information (S302). The travel control ECU 24 of the vehicle 2 formulates a travel plan using the map information selected by the MPU 23. At this time, when the vehicle 2 intends to travel in the no-lane section, the travel plan for the no-lane section is formulated by using the statistical trajectory information transmitted from the probe server 11 as the route information of the no-lane section (S303).

Note that it is unnecessary for all the vehicles 2 to have the autonomous driving system 20 in the vehicle travel assistance system illustrated in FIG. 1. As illustrated in FIG. 3, a process in this system mainly includes a process of collecting and analyzing probe information of the vehicle 2 and a process of formulating a travel plan in vehicle 2 using the result thereof (statistical trajectory information). The statistical trajectory information is more reliable when being created based on a larger number of pieces of probe information. Although the vehicle equipped with the autonomous driving system is described as an example in the present embodiment, there is no problem in using probe information from a vehicle, which can collect and transmit trajectory information of the own vehicle with the required accuracy, to generate the statistical trajectory information even if the autonomous driving system is not mounted.

Figure 4:
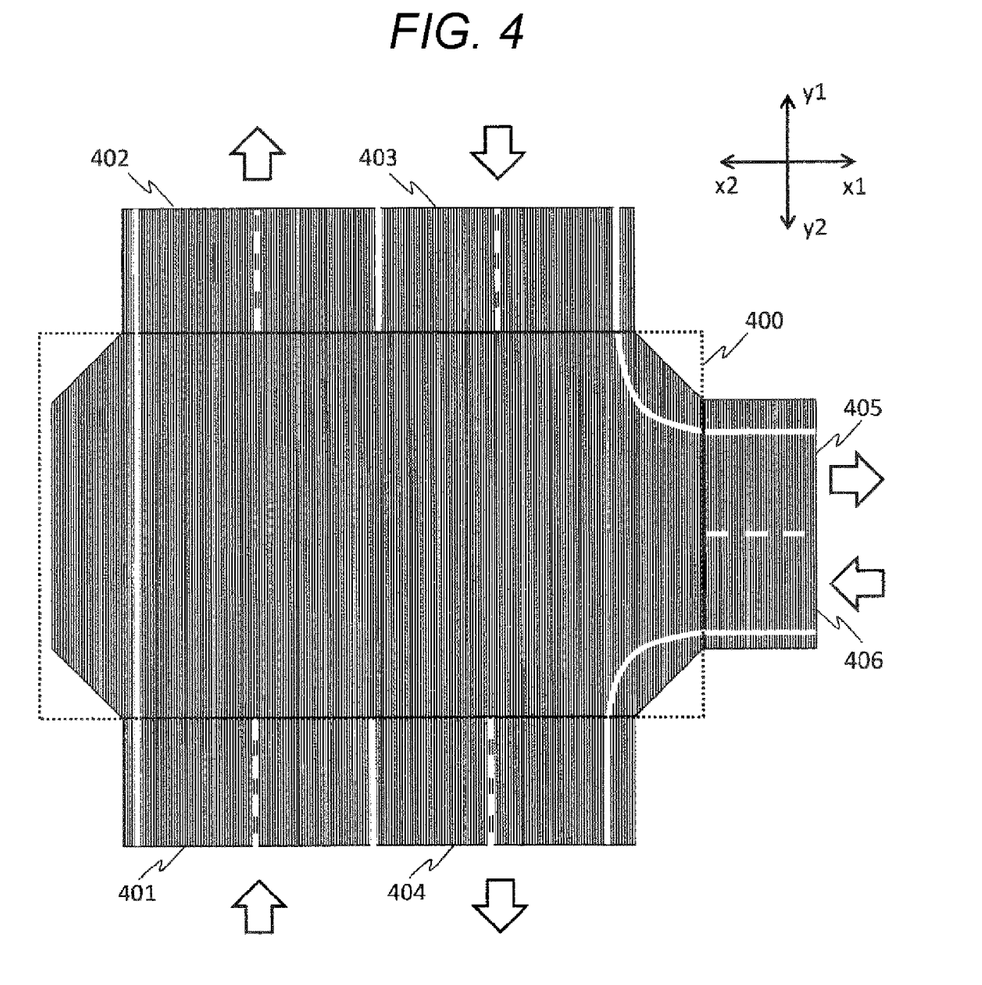
FIG. 4 is an example of the no-lane section.

FIG. 4 illustrates an example of the no-lane section targeted by the vehicle travel assistance system. A no-lane section 400 is an area where a road 401 with two lanes in a running direction y1, a road 402 with two lanes in the running direction y1, and a road 403 with two lanes in a running direction y2, a road 404 with two lanes in the running direction y2, a road 405 with one lane in a running direction x1, and a road 406 with one lane in a running direction x2 intersect each other. The vehicle travel assistance for autonomous driving in the no-lane section 400 illustrated in FIG. 4 will be described hereinafter according to the flowchart of FIG. 3.

(Step S301)

Figure 5:
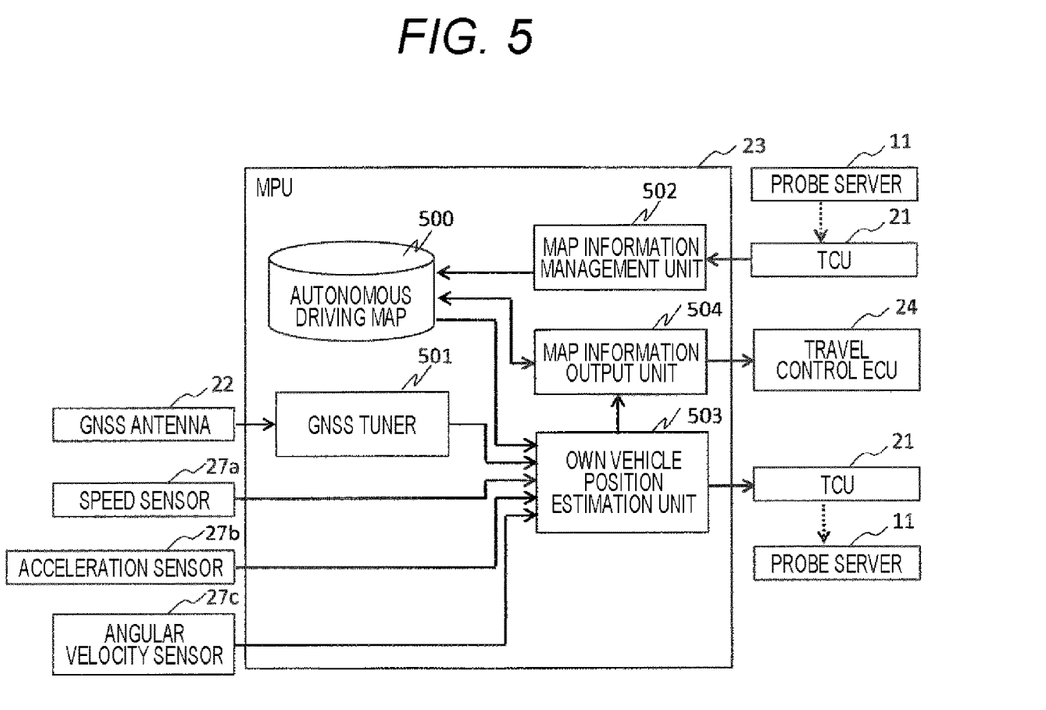
FIG. 5 is a block diagram of a map position unit.

FIG. 5 illustrates a block diagram of the MPU 23. The MPU 23 also has the basic hardware configuration illustrated in FIG. 2, an autonomous driving map 500 is stored in the auxiliary memory 203, and a block that executes the processing of the MPU 23, which will be described later, is implemented as software executed on the processor 201 or dedicated hardware.

The autonomous driving map 500 is a map used by the travel control ECU 24 to formulate a travel plan, and roads are divided by changes in a structure. A road illustrated in FIG. 4 is divided into the no-lane section 400 and each of the roads 401 to 406 according to the structure thereof, and is stored as map information including a start point position, an end point position, and the like for each of the roads. The autonomous driving map 500 is updated from time to time. Therefore, when receiving update information of the map information from the probe server 11 via the TCU 21, the map information management unit 502 updates the autonomous driving map 500 according to the received update information.

The own vehicle position estimation unit 503 of the MPU 23 creates probe information of the own vehicle and transmits the probe information to the probe server 11 via the TCU 21. Here, the probe information includes at least time, position information of the own vehicle at the time, and a vehicle attribute of the own vehicle. Here, it is desirable to identify a position of the own vehicle as a position of a center of a rear wheel axle of the vehicle. This is because the position of the center of the rear wheel axle of the vehicle is hardly affected by variations caused by steering of the vehicle. A position and direction information obtained by demodulating a signal from the GNSS with a GNSS tuner 501 and sensor information provided in the vehicle 2 are used together in order to estimate the position of the own vehicle. For example, the estimation of the position of the own vehicle (inertial navigation) can be performed using a vehicle speed sensor 27a that obtains vehicle speed information from a wheel rotation speed, acceleration information from an acceleration sensor 27b, and angular velocity information from an angular velocity sensor 27c. In addition, it is assumed that the vehicle attribute includes a wheelbase or a vehicle length. This is because a bus or a truck with a long vehicle length needs to make a larger turn than a private vehicle with a short vehicle length when turning left or right, which affects the travel trajectory of the vehicle. The MPUs 23 of the vehicles 2-1 to 2-N transmit the probe information to the probe server 11 at a predetermined cycle (for example, once every 500 ms).

(Step S311)

Figure 6:
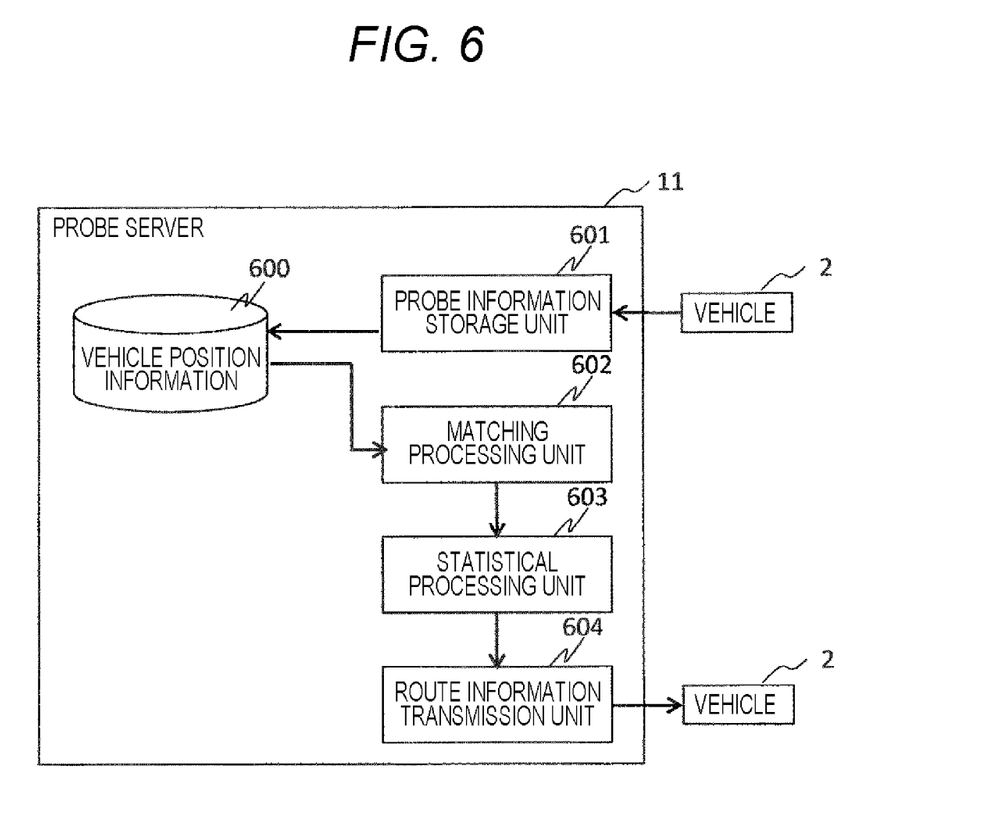
FIG. 6 is a block diagram of a probe server.

FIG. 6 illustrates a block diagram of the probe server (vehicle travel assistance device) 11. Vehicle position information 600 is stored in the storage of the server, and the block that executes the processing of the probe server 11, which will be described later, is implemented as software executed by the server or dedicated hardware.

A probe information storage unit 601 stores probe information sent from vehicles in the vehicle position information 600.

(Step S312)

Figure 7:
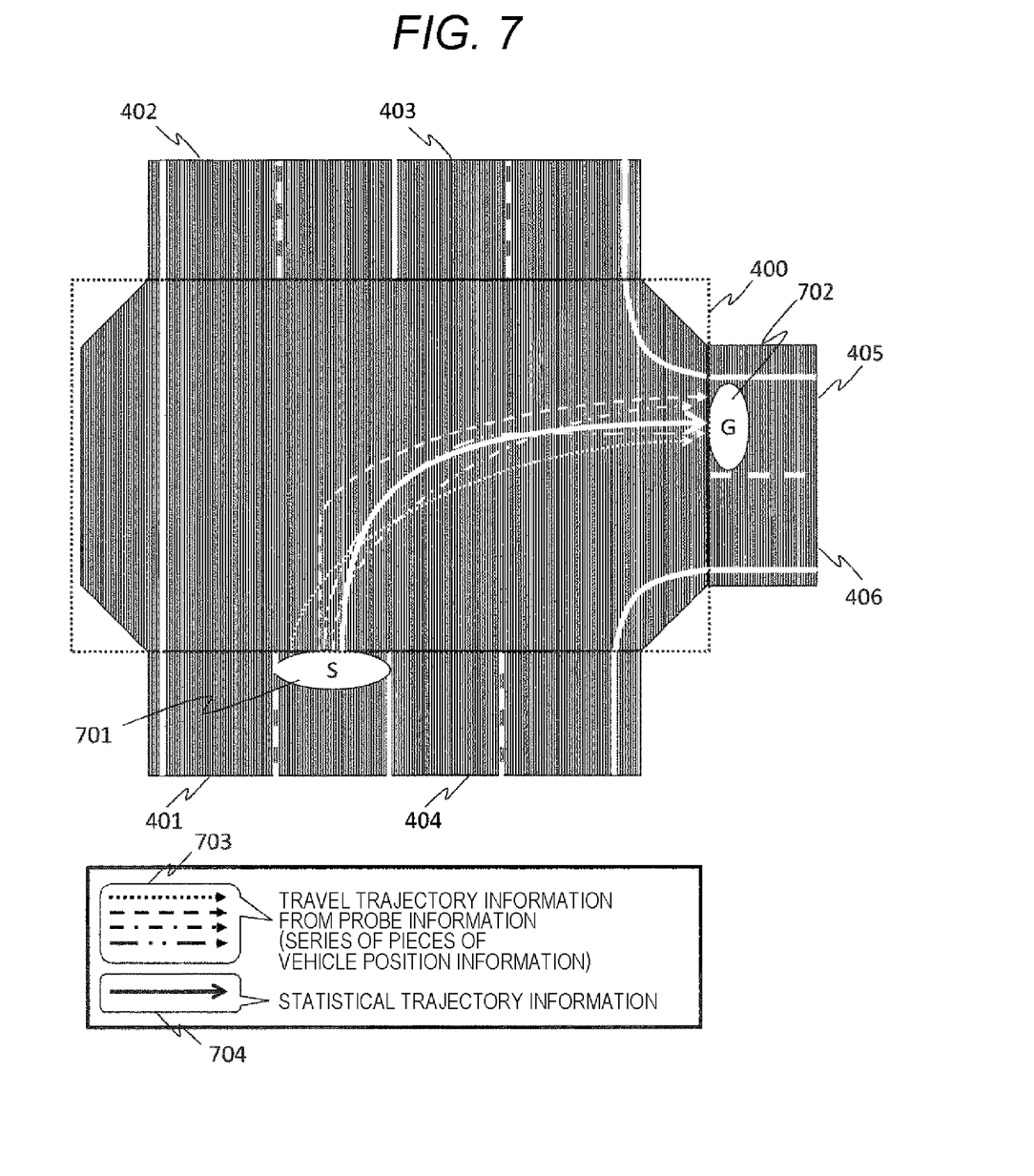
FIG. 7 is an example of travel trajectory information in the no-lane section illustrated in FIG. 4.

A matching processing unit 602 (see FIG. 6) of the probe server 11 first extracts the probe information in the no-lane section, and then, extracts travel trajectory information of the vehicles with the same entry point and exit point for the no-lane section (matching processing). In the case of the no-lane section 400 illustrated in FIG. 4, there are a total of five entry points including end point positions of the road 401 (two lanes), end point positions of the road 403 (two lanes), and an end point position of the road 406 (one lane), and a total of five exit points including start point positions of the road 402 (two lanes), start point positions of the road 404 (two lanes), and a start point position of the road 405 (one lane). Therefore, the travel trajectory information of the vehicles for possible combinations of the five entry points and the five exit points is extracted in the case of the no-lane section 400. For example, FIG. 7 illustrates an example in which the matching processing is performed with an end point position of an inner lane of the road 401 as an entry point 701 and the start point position of the road 405 as an exit point 702, and travel trajectory information 703 as indicated by a dotted line, a broken line, a one-dot chain line, and a two-dot chain line is extracted.

Figure 8:
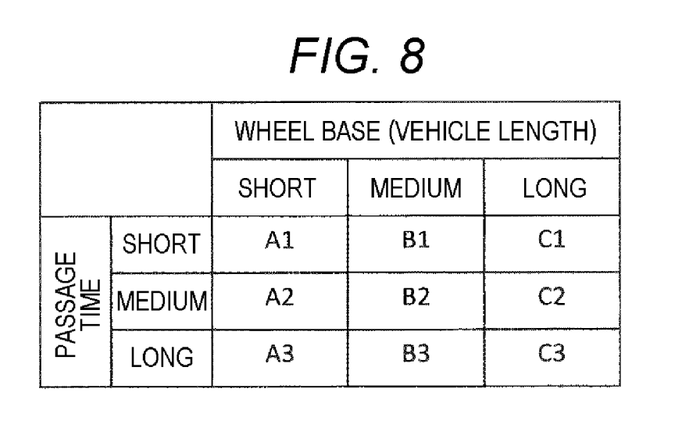
FIG. 8 is an example of categories for calculating statistical trajectory information.

Subsequently, a statistical processing unit 603 calculates statistical trajectory information from the travel trajectory information extracted for a combination of predetermined entry point and exit point. In this case, the travel trajectory information is sorted. FIG. 8 illustrates an example of sorting. In the example of FIG. 8, one axis of sorting is a wheelbase (vehicle length), and the other axis is the passage time of the no-lane section. For the sorting axes (criteria), a factor that affects the travel trajectory of the vehicle in the no-lane section is selected. The passage time of the no-lane section is selected as one of the criteria since the travel trajectory changes according to the speed at which a curve is made in the no-lane section, and thus, it is considered that travel trajectories with close passage time in the no-lane section draw approximate trajectories. In this manner, the travel trajectory information is sorted into nine categories A1 to C3 in the example of FIG. 8, and the statistical trajectory information is calculated from the travel trajectory information belonging to each category. For example, if the travel trajectory information 703 illustrated in FIG. 7 is travel trajectory information belonging to the category A2 of FIG. 8, statistical trajectory information 704 illustrated by a solid line in FIG. 7 is calculated. That is, pieces of statistical trajectory information corresponding to the number of categories (nine in this example) can be obtained for the combination of the entry point 701 and the exit point 702 illustrated in FIG. 7.

Note that the number of the sorting axes, the content of the sorting axis, the number of categories for each axis, and the like are arbitrary, and can be set according to the target no-lane section.

Figure 9:
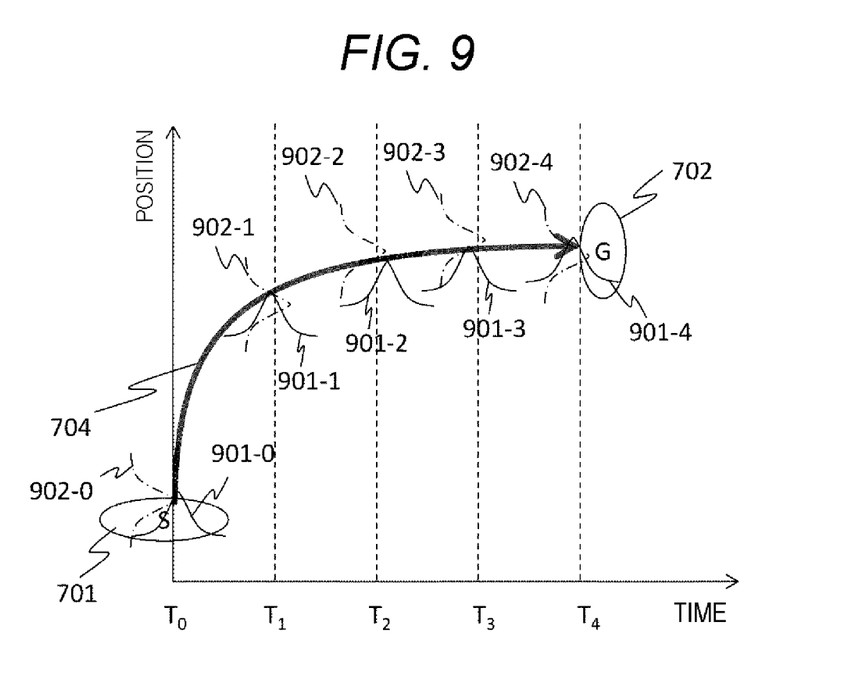
FIG. 9 is an example of a method for calculating the statistical trajectory information.

An example of a method for calculating the statistical trajectory information 704 will be described with reference to FIG. 9. The passage time from the entry point 701 to the exit point 702 is divided into four equal parts at equal intervals, and five time points ($T_0$ to $T_4$) are set. A distribution of position information (statistical position information) in the travel trajectory information at each time point is obtained. In FIG. 9, a distribution in the latitude direction is represented as 901, and a distribution in the longitude direction is represented as 902. A spline curve is generated from the statistical position information at each time point, and is used as the statistical trajectory information 704.

At this time, it is desirable that the statistical processing unit 603 also calculate reliability information. The reliability information is determined based on, for example, how many travel trajectories the statistical trajectory information is generated from. This is because the reliability of the statistical trajectory information increases as the travel trajectories used as bases increase.

(Step S313)

A route information transmission unit 604 (see FIG. 6) of the probe server 11 transmits the calculated statistical trajectory information to the vehicle 2 as the route information of the no-lane section. At this time, it is desirable to also transmit the reliability information of the statistical trajectory information.

(Step S302)

When receiving the statistical trajectory information from the probe server 11, the map information management unit 502 (see FIG. 5) of the MPU 23 updates the autonomous driving map 500 with the received statistical trajectory information.

(Step S303)

The map information output unit 504 of the MPU 23 (see FIG. 5) extracts map information, used by the travel control ECU 24 to formulate a travel plan, from the autonomous driving map 500 and transmits the map information to the travel control ECU 24. When a traveling route includes a no-lane section, one or a plurality of pieces of statistical trajectory information are transmitted based on a traveling state of the own vehicle together with reliability information if the reliability information exists. For example, when the own vehicle (the wheelbase is assumed to be medium) is about to enter the no-lane section 400, one or a plurality of categories B1 to B3 illustrated in FIG. 8 are selected according to the entry speed and transmitted to the travel control ECU.

Figure 10:
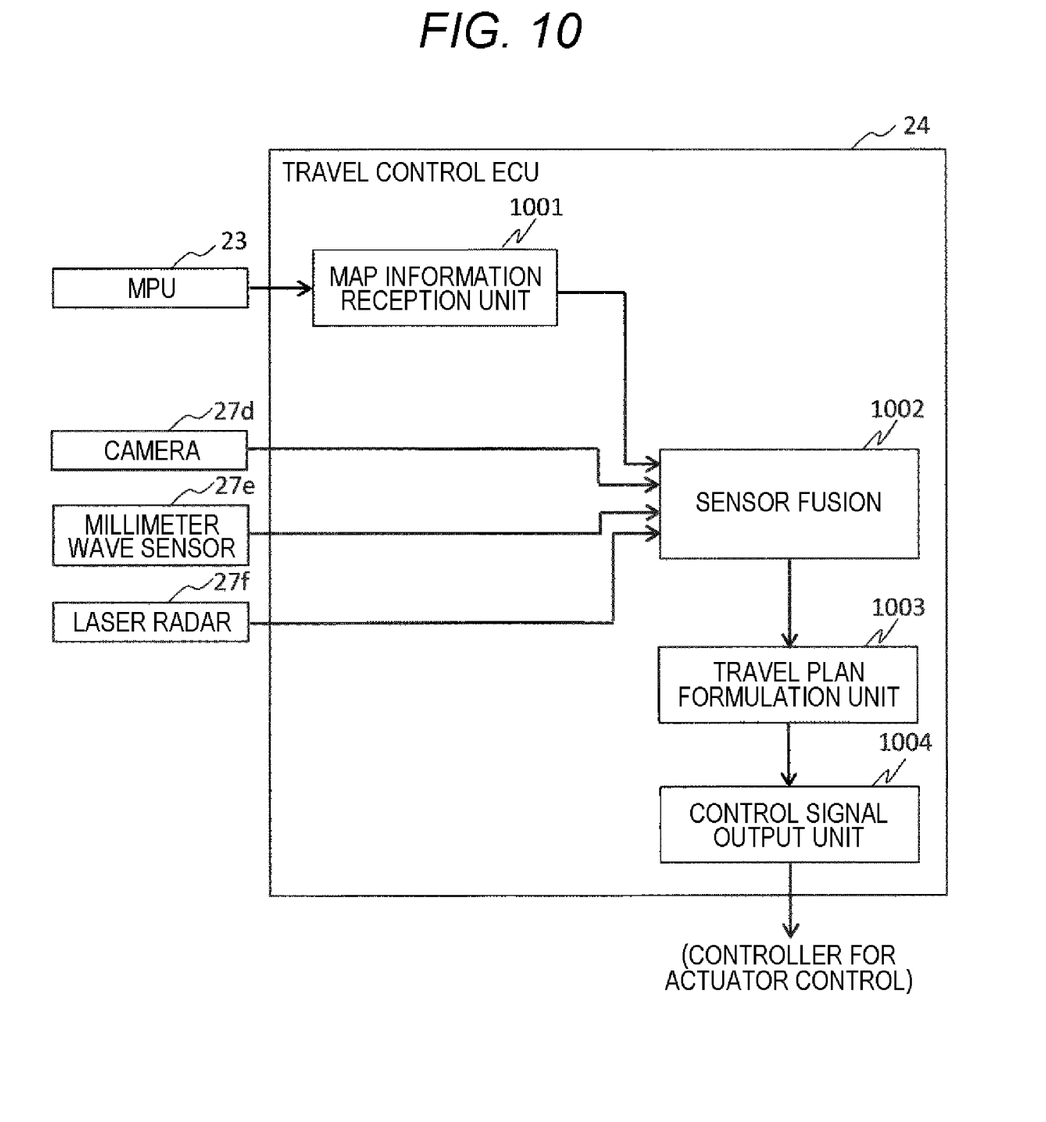
FIG. 10 is a block diagram of a travel control ECU.

FIG. 10 illustrates a block diagram of the travel control ECU 24. The travel control ECU 24 also has the basic hardware configuration illustrated in FIG. 2, a block that executes the processing of the travel control ECU 24, which will be described later, is implemented as software executed on the processor 201 or dedicated hardware.

The map information reception unit 1001 receives the map information extracted by the MPU 23. As described above, one or a plurality of pieces of statistical trajectory information selected by the MPU 23 based on the traveling state of the own vehicle are included for the no-lane section.

In a sensor fusion 1002, for example, sensor data about surrounding information grasped by a camera 27d, a millimeter wave sensor 27e, and a laser radar 27f is superimposed on the map information to more accurately grasp a surrounding situation of the own vehicle.

A travel plan formulation unit 1003 formulates a travel plan based on the surrounding situation of the own vehicle grasped by the sensor fusion 1002. When a plurality of candidates are transmitted from the MPU 23 in the no-lane section, one statistical trajectory information is selected based on the grasped surrounding situation of the own vehicle and reliability information of each of the plurality of candidates.

A control signal output unit 1004 generates and outputs a control signal for the actuator controller (brake ECU 25, steering ECU 26, and the like) in order to control the own vehicle based on the formulated travel plan.

As described above, the route information of the no-lane section can be generated based on the travel information of the vehicle in the present embodiment. As a result, a range to which the autonomous driving system can be applied can be realized without cost increase or sophistication of sensors installed in the transportation infrastructure or the vehicle. For example, as alternatives, it is conceivable to perform autonomous driving assistance (vehicle travel assistance) by laying a magnetic marker or a magnetic field induction cable to guide a vehicle in a no-lane section or mounting a sensor, which can accurately recognize the distance to a feature existing in the no-lane section, on the vehicle. However, in the present embodiment, it is possible to expand the range to which the autonomous driving system can be applied at low cost as compared with these alternatives.

Figure 11:
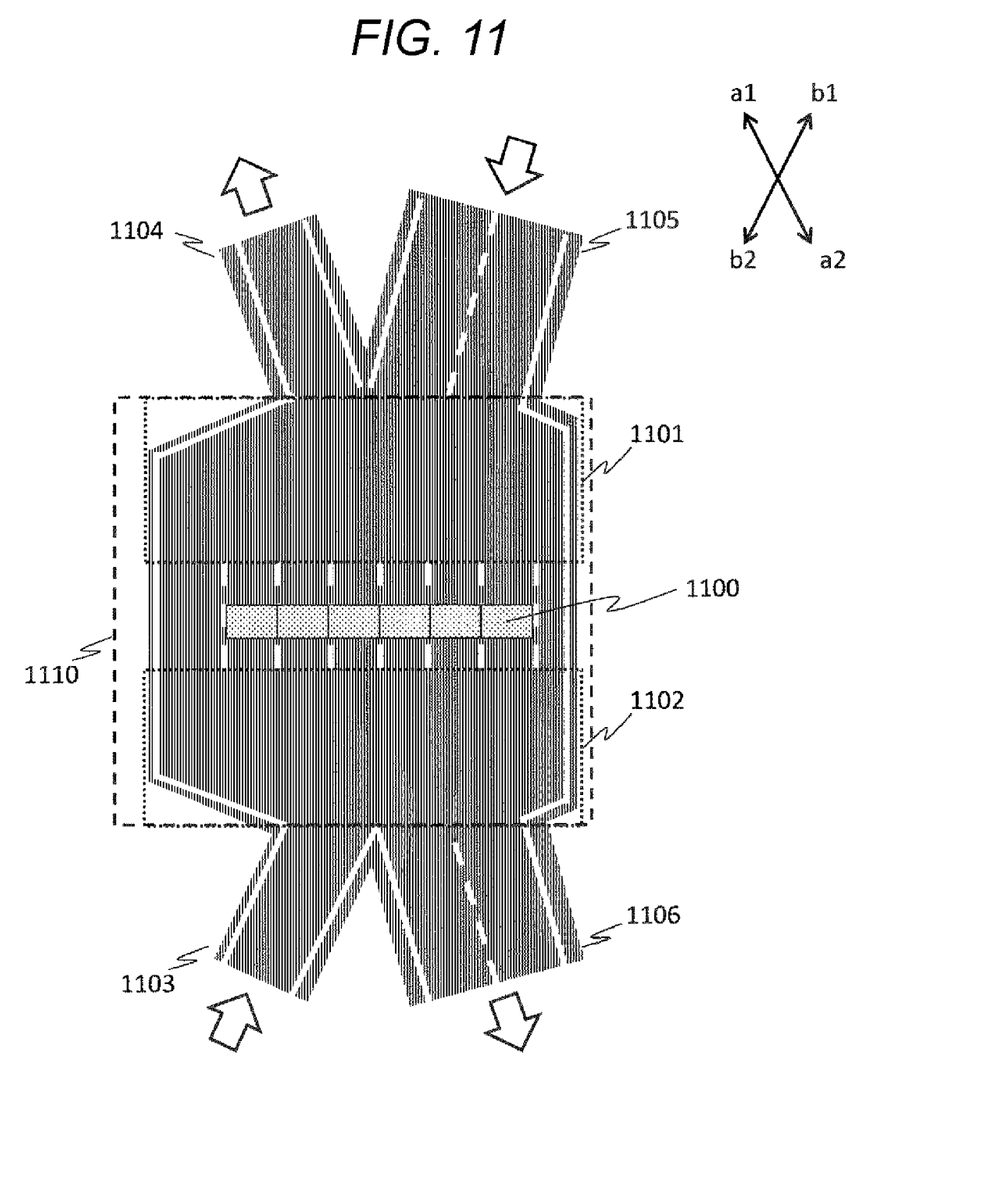
FIG. 11 is an example of the no-lane section.

Although the description has been given in detail regarding the invention made by the present inventor based on the embodiment as above, the present invention is not limited to the embodiment, and can be modified in various ways within a scope not departing from a gist thereof. For example, the target no-lane section is not limited to that illustrated in FIG. 4, and can be applied to a section provided with a toll house on a toll road as illustrated in FIG. 11. In the example of FIG. 11, there are two no-lane sections, that is, a no-lane section 1101 interposed among an area where a gate 1100 is provided, a road 1104 with one lane in a running direction a1, and a road 1105 with two lanes in a running direction b2, and a no-lane section 1102 interposed among the area where the gate 1100 is provided, a road 1103 with one lane in a running direction b1, and a road 1106 with two lanes in a running direction a2. Since the road is divided by the change in its structure in the autonomous driving map as described above, the two no-lane sections exist with the area where the gate 1100 is provided as the boundary. However, a driver of a vehicle only chooses one of the gates 1100 so as to get out of the toll house in the shortest time, and thus, statistical trajectory information may be calculated by treating an area including the area where the gate 1100 is provided and the no-lane sections 1101 and 1102 as a virtual no-lane section 1110.

REFERENCE SIGNS LIST 1 probe center
2 vehicle
3 network
11 probe server (vehicle travel assistance device)
12 center communication device
20 autonomous driving system
21 telematics control unit
22 GNSS antenna
23 map position unit
24 travel control ECU
25 brake ECU
25a brake
26 steering ECU
26a steering
27 sensor
27a vehicle speed sensor
27b acceleration sensor
27c angular velocity sensor
28 in-vehicle network
200 functional unit
201 processor
202 main memory
203 auxiliary memory
204 network interface
205 bus
400, 1101, 1102 no-lane section
401, 402, 403, 404, 405, 406, 1103, 1104, 1105, 1106 road
500 autonomous driving map
501 GNSS tuner
502 map information management unit
503 own vehicle position estimation unit
504 map information output unit 600 vehicle position information
601 probe information storage unit
602 matching processing unit
603 statistical processing unit
604 route information transmission unit
701 entry point
702 exit point
703 travel trajectory information
704 statistical trajectory information
901 statistical position information in latitude direction
902 statistical position information in longitude direction
1001 map information reception unit
1002 sensor fusion
1003 travel plan formulation unit
1004 control signal output unit
1100 gate
1110 virtual no-lane section.

The invention claimed is:

1. A vehicle travel assistance method in a no-lane section comprising:
   a probe information storage step of storing probe information transmitted from a plurality of vehicles;
   a matching processing step of extracting travel trajectory information of the vehicles in the no-lane section from the probe information stored in the probe information storage step and extracting vehicle travel trajectory information per combination of an entry point and an exit point for the no-lane section;
   a statistical processing step of sorting the vehicle travel trajectory information per combination of the entry point and the exit point for the no-lane section extracted in the matching processing step into a plurality of categories according to a predetermined criterion and calculating statistical trajectory information by statistical processing of the travel trajectory information for each of the plurality of categories; and
   a route information transmission step of transmitting the statistical trajectory information calculated in the statistical processing step to the plurality of vehicles as vehicle route information in the no-lane section;
   wherein
   in the statistical processing step, the vehicle travel trajectory information per combination of the entry point and the exit point for the no-lane section extracted in the matching processing step is sorted into the plurality of categories according to a plurality of criteria, and
   the plurality of criteria include a vehicle wheelbase or a vehicle length, and a passage time required for a vehicle to pass through the no-lane section.

2. The vehicle travel assistance method according to claim 1, wherein
   in the statistical processing step, reliability information is calculated based on a number of vehicle travel trajectories per combination of the entry point and the exit point for the no-lane section used for calculating the statistical trajectory information, and
   in the route information transmission step, the reliability information is transmitted together with the statistical trajectory information.

3. The vehicle travel assistance method according to claim 1, wherein
   the vehicle route information transmitted in the route information transmission step forms a part of a vehicle autonomous driving map.

4. A vehicle travel assistance device, which is connected to be capable of communicating with a plurality of vehicles via a network, comprising:
   a probe information storage unit that stores probe information transmitted from the plurality of vehicles;
   a matching processing unit that extracts travel trajectory information of the vehicles in the no-lane section from the stored probe information and extracts vehicle travel trajectory information per combination of an entry point and an exit point for the no-lane section;
   a statistical processing unit that sorts the extracted vehicle travel trajectory information per combination of the entry point and the exit point for the no-lane section into a plurality of categories according to a predetermined criterion and calculates statistical trajectory information by statistical processing of the travel trajectory information for each of the plurality of categories; and
   a route information transmission unit that transmits the statistical trajectory information to the plurality of vehicles as vehicle route information in the no-lane section; wherein
   the statistical processing unit sorts the vehicle travel trajectory information per combination of the entry point and the exit point for the no-lane section into the plurality of categories according to a plurality of criteria, and
   the plurality of criteria include a vehicle wheelbase or a vehicle length, and a passage time required for a vehicle to pass through the no-lane section.

5. The vehicle travel assistance device according to claim 4, wherein
   the statistical processing unit calculates reliability information based on a number of vehicle travel trajectories per combination of the entry point and the exit point for the no-lane section used for calculating the statistical trajectory information, and
   the route information transmission unit transmits the reliability information together with the statistical trajectory information.

6. An autonomous driving system comprising:
   a map position unit that manages an autonomous driving map and estimates a position of an own vehicle; and
   a travel control unit that formulates a travel plan based on map information from the map position unit,
   wherein
   the autonomous driving map has route information, obtained for each of a plurality of categories sorted according to a predetermined criterion, for a no-lane section per combination of an entry point and an exit point for the no-lane section,
   the map position unit selects one or a plurality of pieces of the route information for each of the plurality of categories for the no-lane section based on a traveling state of the own vehicle, and
   the travel control unit formulates a travel plan of a route including the no-lane section based on the one or plurality of pieces of route information selected by the map position unit; wherein
   a passage time required for a vehicle to pass through the no-lane section is included as the predetermined criterion, and
   the map position unit selects the one or plurality of pieces of route information for each of the plurality of categories for the no-lane section based on an entry speed of the own vehicle into the no-lane section.

7. The autonomous driving system according to claim 6, further comprising
   a sensor that monitors a surrounding situation of the own vehicle, wherein the travel control unit formulates the travel plan by sensor fusion of the one or plurality of pieces of route information selected by the map position unit and the surrounding situation monitored by the sensor.

8. The autonomous driving system according to claim 6, wherein
the map position unit transmits probe information including the estimated position of the own vehicle to a vehicle travel assistance device via a network.

9. The autonomous driving system according to claim 8, wherein
the probe information includes time, a position of the own vehicle at the time, and a wheelbase of the own vehicle or a vehicle length.

10. The autonomous driving system according to claim 8, wherein
the route information for the no-lane section in the autonomous driving map is statistical trajectory information calculated as the vehicle travel assistance device extracts vehicle travel trajectory information in the no-lane section from the probe information transmitted from a plurality of vehicles and stored, extracts the vehicle travel trajectory information per combination of an entry point and an exit point for the no-lane section, sorts the vehicle travel trajectory information per combination of the entry point and the exit point for the no-lane section into the plurality of categories, and performs statistical processing of the travel trajectory information for each of the plurality of categories.

11. The autonomous driving system according to claim 10, wherein
the vehicle travel assistance device calculates reliability information based on a number of vehicle travel trajectories per combination of the entry point and the exit point for the no-lane section used to calculate the statistical trajectory information, and
the travel control unit formulates the travel plan based on one or a plurality of pieces of route information and reliability information selected by the map position unit.

12. The autonomous driving system according to claim 6, further comprising
an actuator controller that controls an actuator included in the own vehicle,
wherein the travel control unit outputs a control signal to the actuator controller based on the travel plan.

* * * * *